(12) United States Patent
Stolarczyk (10) Patent No.: US 6,892,815 B2
(45) Date of Patent: May 17, 2005

(54) COAL BED METHANE BOREHOLE PIPE LINER PERFORATION SYSTEM

(76) Inventor: Larry G. Stolarczyk, 848 Clayton Hwy., Raton, NM (US) 87740

( * ) Notice: Subject to any disclaimer, the term of this patent is extended or adjusted under 35 U.S.C. 154(b) by 227 days.

(21) Appl. No.: 10/287,017

(22) Filed: Nov. 4, 2002

(65) Prior Publication Data

US 2003/0075327 A1 Apr. 24, 2003

Related U.S. Application Data

(63) Continuation of application No. 09/905,552, filed on Jul. 12, 2001, now Pat. No. 6,497,457.

(51) Int. Cl.$^7$ .............................................. E21B 43/112
(52) U.S. Cl. ................. 166/298; 166/55.2; 166/250.03; 166/254.2; 166/369; 175/50; 175/61; 175/266
(58) Field of Search ........................ 166/55, 55.1, 55.2, 166/250.03, 254.2, 369, 298; 175/40, 50, 58, 59, 61, 62, 263, 266, 267

(56) References Cited

U.S. PATENT DOCUMENTS

| | | | |
|---|---|---|---|
| 3,934,649 A | * | 1/1976 | Pasini et al. .............. 166/250.1 |
| 4,165,784 A | * | 8/1979 | Gardner ...................... 166/55.3 |
| 4,577,153 A | | 3/1986 | Stolarczyk |
| 4,691,166 A | | 9/1987 | Stolarczyk |
| RE32,563 E | | 12/1987 | Stolarczyk |
| 4,742,305 A | | 5/1988 | Stolarczyk |
| 4,753,484 A | | 6/1988 | Stolarczyk |
| 4,777,652 A | | 10/1988 | Stolarczyk |
| 4,879,755 A | | 11/1989 | Stolarczyk |
| RE33,458 E | | 11/1990 | Stolarczyk |
| 4,968,978 A | | 11/1990 | Stolarczyk |
| 4,994,747 A | | 2/1991 | Stolarczyk |
| 5,066,917 A | | 11/1991 | Stolarczyk |
| 5,072,172 A | | 12/1991 | Stolarczyk |
| 5,087,099 A | | 2/1992 | Stolarczyk |
| 5,093,929 A | | 3/1992 | Stolarczyk |
| 5,121,971 A | | 6/1992 | Stolarczyk |
| 5,146,611 A | | 9/1992 | Stolarczyk |
| 5,181,934 A | | 1/1993 | Stolarczyk |
| 5,188,426 A | | 2/1993 | Stolarczyk |
| 5,260,660 A | | 11/1993 | Stolarczyk |
| 5,268,683 A | | 12/1993 | Stolarczyk |
| 5,301,082 A | | 4/1994 | Stolarczyk |
| 5,408,182 A | | 4/1995 | Stolarczyk |
| 5,411,104 A | * | 5/1995 | Stanley ........................ 175/65 |
| 5,474,261 A | | 12/1995 | Stolarczyk |
| 5,686,841 A | | 11/1997 | Stolarczyk |
| 5,769,503 A | | 6/1998 | Stolarczyk |
| 6,497,457 B1 | * | 12/2002 | Stolarczyk ................... 299/12 |
| 2003/0094282 A1 | * | 5/2003 | Goode et al. ............. 166/255.2 |

\* cited by examiner

*Primary Examiner*—Zakiya Walker
(74) *Attorney, Agent, or Firm*—Richard B. Main (57) ABSTRACT

A coalbed methane borehole pipe liner perforation system comprises a plastic pipe punch that slips down inside a coalbed methane production borehole lined with a non-perforated plastic pipe. A ground-penetrating radar is used inside the plastic-pipe lined borehole to determine which sections of the pipe are in contact with groundwater. The punch is then operated along the length of the plastic-pipe lined borehole to perforate it for methane-gas collection wherever such groundwater is not present. A radar survey to determine groundwater contact can be made simultaneously in combination with the punching of liner pipe perforations, or earlier in a separate operation.

10 Claims, 5 Drawing Sheets

COAL BED METHANE BOREHOLE PIPE LINER PERFORATION SYSTEM

RELATED APPLICATION

This application is a continuation in part of U.S. Application Ser. No. 09/905,552, filed Jul. 12, 2001, now U.S. Pat. No. 6,497,457.

BACKGROUND OF THE INVENTION

1. Field of the Invention

The invention relates generally to coalbed methane collection from horizontal boreholes drilled in coal seams, and more specifically to perforation systems that punch gas collection holes in plastic liner pipes in such boreholes only if there is no water infiltration of the adjacent media surrounding a particular pipe section.

2. Description of the Prior Art

Natural deposits of coal are sometimes charged with methane gas, e.g., coalbed methane (CBM). Such CBM can be sold at a profit if the costs to produce it are minimized. In the past, such CBM was simply dissipated and wasted because it was too expensive to collect it. One of the expenses in coal mines has been dealing with groundwater and the problems caused when it floods the mine workings.

Horizontal drilling methods are used to dig CBM-gas collection boreholes in virgin coal deposits. If the drilling encounters groundwater, e.g., as caused by faulting in the coal deposit or the punching through of the floor or ceiling into water-laden sandstone, such water can flood the whole borehole and prevent CBM-gas collection. Such water can either be pumped out, sealed out, or avoided by smart drilling.

In U.S. Pat. No. 3,934,649, issued Jan. 27, 1976, Pasini and Overby describe a method for removing methane from coalbeds prior to mining the coal. It comprises drilling at least one borehole from the surface into the coalbed. The borehole is started at a slant rather than directly vertically, and as it descends, a gradual curve is followed until horizontal and the desired portion of the coalbed is intersected. Approaching the coalbed in this manner and fracturing the coalbed in the major natural fraction direction cause release of large amounts of the trapped methane gas.

U.S. Pat. No. 4,299,295, issued Nov. 10, 1981, to Amzi Gossard, describes a process for drilling spaced horizontal boreholes in coal and other mineral deposits. The boreholes are typically in excess of 1500 feet long, and patterned to maximize gas removal. Directional drilling guidance is provided by a continuous downhole survey tool connected to data display devices by an internal drill rod cable system. Directional drilling control is provided by a positive displacement motor positioned at the end of the drill string and operated by a flow of drilling fluid through the drill string from the drilling rig. The mineral strata surrounding the borehole is periodically hydrofractured to permit effective removal of the gas. The hydrofractionation is effected without removal of the drill string or survey instruments from the borehole. Upon completion of the borehole, the drill string is removed and gas which enters the borehole from the surrounding deposit is withdrawn. David Summers, et al., describe in U.S. Pat. No. 4,317,492, a method and apparatus for drilling horizontal holes in geological structures from a vertical bore. The geological structures intended to be penetrated in this fashion are coal seams, as for in situ gasification or methane drainage, or in oil-bearing strata for increasing the flow rate from a pre-existing well. Other possible uses for this device might be for use in the leaching of uranium ore from underground deposits or for introducing horizontal channels for water and steam injections.

The present inventor, Larry G. Stolarczyk, has described methods and equipment for imaging coal formations in geologic structures in many United States Patents. Some of those Patents are listed in Table I, and are incorporated herein by reference.

TABLE I

| U.S. Pat. No. | Issued | Title |
| --- | --- | --- |
| US04577153 | Mar. 18, 1986 | Continuous Wave Medium Frequency Signal Transmission Survey Procedure For Imaging Structure In Coal Seams |
| US04691166 | Sep. 01, 1987 | Electromagnetic Instruments For Imaging Structure In Geologic Formations |
| US04742305 | May 03, 1988 | Method For Constructing Vertical Images Of Anomalies In Geological Formations |
| US04753484 | Jun. 28, 1988 | Method For Remote Control Of A Coal Shearer |
| US04777652 | Oct. 11, 1988 | Radio Communication Systems For Underground Mines |
| US04879755 | Nov. 07, 1989 | Medium Frequency Mine Communication System |
| US04968978 | Nov. 06, 1990 | Long Range Multiple Point Wireless Control And Monitoring System |
| US04994747 | Feb. 19, 1991 | Method And Apparatus For Detecting Underground Electrically Conductive Objects |
| US05066917 | Nov. 19, 1991 | Long Feature Vertical Or Horizontal Electrical Conductor Detection Methodology Using Phase Coherent Electromagnetic Instrumentation |
| US05072172 | Dec. 10, 1991 | Method And Apparatus For Measuring The Thickness Of A Layer Of Geologic Material Using A Microstrip Antenna |
| US05087099 | Feb. 11, 1992 | Long Range Multiple Point Wireless Control And Monitoring System |
| US05093929 | Mar. 03, 1992 | Medium Frequency Mine Communication System |
| US05121971 | Jun. 16, 1992 | Method Of Measuring Uncut Coal Rib Thickness In A Mine |
| US05146611 | Sep. 08, 1992 | Mine Communication Cable And Method For Use |
| US05181934 | Jan. 26, 1993 | Method For Automatically Adjusting The Cutting Drum Position Of A Resource Cutting Machine |
| US05188426 | Feb. 23, 1993 | Method For Controlling The Thickness Of A Layer Of Material In A Seam |
| US05260660 | Nov. 09, 1993 | Method For Calibrating A Downhole Receiver Used In Electromagnetic Instrumentation For Detecting An Underground Conductor |
| US05268683 | Dec. 07, 1993 | Method Of Transmitting Data From A Drillhead |
| US05301082 | Apr. 05, 1994 | Current Limiter Circuit |
| US05408182 | Apr. 18, 1995 | Facility And Method For The Detection And Monitoring Of Plumes Below A Waste Containment Site With Radiowave Tomography Scattering Methods |
| US05474261 | Dec. 12, 1995 | Ice Detection Apparatus For Transportation Safety |
| US05686841 | Nov. 11, 1997 | Apparatus And Method For The Detection And Measurement Of Liquid Water And Ice Layers On The Surfaces Of Solid Materials |
| US05769503 | Jun. 23, 1998 | Method And Apparatus For A Rotating Cutting Drum Or Arm Mounted With Paired Opposite Circular Polarity Antennas And Resonant Microstrip Patch Transceiver For Measuring Coal, Trona And Potash Layers Forward, Side And Around A Continuous Mining Machine |

TABLE I-continued

| U.S. Pat. No. | Issued | Title |
|---|---|---|
| USRE032563 | Dec. 15, 1987 | Continuous Wave Medium Frequency Signal Transmission Survey Procedure For Imaging Structure In Coal Seams |
| USRE033458 | Nov. 27, 1990 | Method For Constructing Vertical Images Of Anomalies In Geological Formations |

The present inventor, Larry Stolarezyk, describes the drilling, imaging, and coal-bed methane production ahead of mining in U.S. patent application, Ser. No. 09/905,552, filed Jul. 12, 2001, and now U.S. Pat. No. 6,497,457, and is incorporated herein by reference. Such directional drilling can be used to bore several horizontal shafts through a coal deposit with its natural overburden still intact. Any methane gas permeating the coal deposit is pumped out and preferably sold as natural gas to commercial and residential customers, or used locally in support of mining operations. The methane gas evacuation continues until the concentrations are reduced to safe levels for mining. But before mining begins, ground penetrating radar equipment is lowered into the boreholes for electronic imaging studies of the coal deposit. One borehole is used for a transmitter and another for a receiver. Many measurements are made at a variety of frequencies and equipment positions within the boreholes. Such studies estimate the electrical conductivity of the surrounding material, and thereby give clues where and how much coal is actually deposited. More accurate assessments of the coal reserve can then be developed from this information, and the results can be used with much higher confidence than the traditional reserve estimates obtained with conventional methods. The better numbers are preferably used to dictate business planning.

SUMMARY OF THE PRESENT INVENTION

Briefly, a coalbed methane borehole pipe liner perforation system embodiment of the present invention comprises a plastic pipe punch that slips down inside a coalbed methane production borehole lined with a non-perforated plastic pipe. A ground-penetrating radar is used inside the plastic-pipe lined borehole to determine which sections of the pipe are in contact with groundwater. The punch is then operated along the length of the plastic-pipe lined borehole to perforate it for methane-gas collection wherever groundwater is not present. A radar survey to determine groundwater contact can be made simultaneously in combination with the punching of liner pipe perforations, or earlier in a separate operation.

An advantage of the present invention is that a coalbed methane borehole pipe liner perforation system is provided that helps keep boreholes free of groundwater inundation.

Another advantage of the present invention is that a coalbed methane borehole pipe liner perforation system is provided that increases coalbed methane production profits.

A further advantage of the present invention is a coalbed methane borehole pipe liner perforation system is provided that is compatible with conventional coalbed methane production methods and equipment.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENTS

Figure 1:
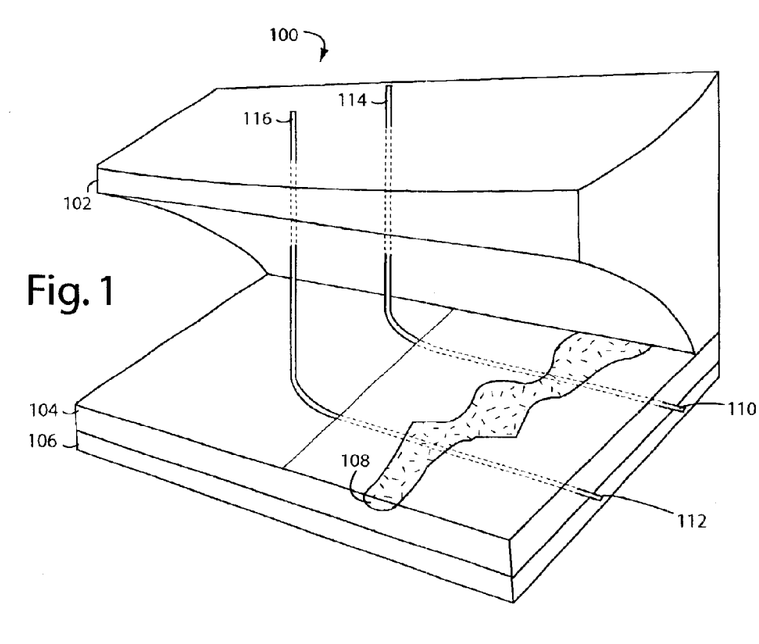
FIG. 1 is a diagram of a coal mine operation in an embodiment of the present invention that uses directional drilling and measurements-while-drilling radar to guide the drilling of horizontal boreholes in the vertical centers of coal deposits.

FIG. 1 illustrates a coal mine operation 100 in its earliest stages of development. An overburden 102 of soils covers a coal layer 104. This in turn overlies a deeper substrate layer 106. The coal layer 104 may be interrupted by a fault or scouring that happened over geologic time and was filled with sandstone, e.g., a paleochannel 108. At a minimum, the coal layer will undulate and vary in thickness.

The sandstone in paleochannel 108 is porous and can be saturated with water. If so, flooding of the coal mine can occur from overhead if the coal layer just under the paleochannel is faulted or cut. It is therefore in the economic and safety,interests of mining operations to avoid punching through such paleochannel 108 when taking the coal in coal layer 104.

The coal layer 104 will typically contain valuable reserves of methane gas that can be pumped out through a network of horizontally running boreholes 110 and 112. These boreholes are begun as vertical bores 114 and 116 using a directional drilling method.

Figure 2:
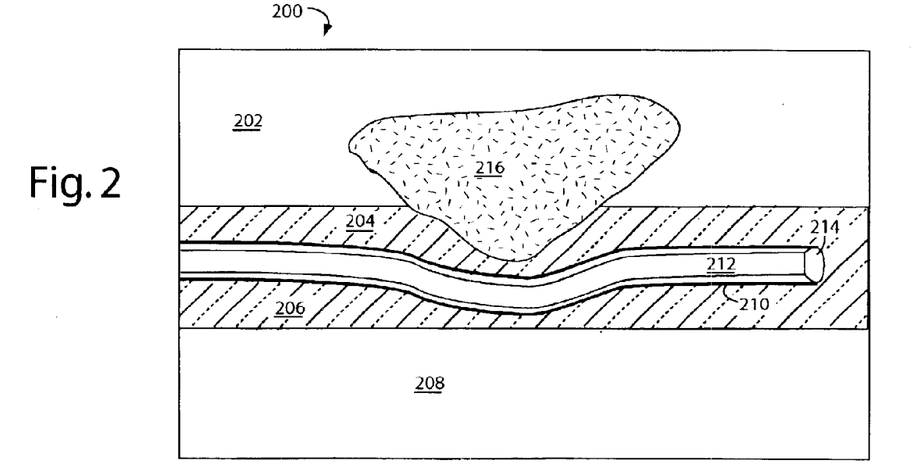
FIG. 2 is a cross sectional diagram of a coal deposit, similar to FIG. 1, in which a sandstone paleochannel is protruding from the ceiling of the coal deposit, and in which the drilling of a horizontal borehole has dived down below the paleochannel to stay within the middle of the coal.

FIG. 2 illustrates a horizontal drilling operation 200. An overburden 202 sits on top of a coalbed deposit represented by an upper coal deposit 204 and a lower coal deposit 206. These overlie a deeper substrate 208. The coalbed deposit is preferably drilled such that a horizontal borehole 210 is vertically equidistant between upper and lower coal deposits 204 and 206. In some situations, the horizontal borehole 210 may need to be lined with a perforated plastic pipe that lacks perforations in the water saturated areas.

Such horizontal borehole 210 is drilled by a drillstring 212 that has a steerable, directional drillhead 214. A paleochannel 216 filled with sandstone and probably saturated with water represents a common hazard in such mining. FIG. 2 shows that the horizontal borehole 210 has been drilled to stay in the middle of whatever vertical space there is to work within the upper and lower coal deposits 204 and 206. Such guidance while drilling requires a non-invasive probing of the deposits ahead of the drilling that is provided by embodiments of the present invention.

A natural waveguide occurs in layered coal seam sedimentary geology because there is a contrast between the electrical conductivity of the coal and that of shale, mudstone, and/or fire clay. The conductivity of coal is about 0.0005 S/m (2,000 ohm-meters). So dry coal is a pretty good insulator. The typical bounding layers have electrical conductivity in the range of 0.01 to 0.1 Siemens per meter (S/m). Such 20:1 conductivity contrast creates a natural waveguide, and any induced electromagnetic (EM) waves will travel along inside the coalbed layer.

An electric field (EZ) component of the traveling EM wave is vertically polarized, and the magnetic field (Hy) component is horizontally polarized in the seam. The energy in this part of the EM wave travels laterally in the coal seam from a transmitter to a receiver, e.g., a Stolar Horizon Radio Imaging Method (RIM) receiver. A horizontally polarized electric field (EX) component has a zero value near the vertical center of the seam, and is maximum at the sedimentary rock-coal interface. It is this EX component that is responsible for EM wave signal transmission into the boundary rock layer. The energy in this part of the EM wave travels vertically in the coal deposit.

In such waveguide, the coal seam radiowave magnitude diminishes over distance for two reasons. The first is the attenuation rate of the waveguide. The second is the radial spreading of wave energy as it travels away from the transmitter. The cylindrical spread can be mathematically represented by $$\frac{1}{\sqrt{r}},$$

where r is the distance from the transmitting to receiving antenna. This compares with a non-waveguide far field spherically spreading factor of $$\frac{1}{r}.$$

Thus, at hundred meters, the magnitude of the seam EM wave decreases by a factor of only ten in the waveguide, and by a factor of hundred in an unbounded media.

An significant advantage of the seam waveguide is signals can travel farther. Another advantage is the traveling electromagnetic wave predominantly remains within the coal seam waveguide.

Such coal seam electromagnetic wave is very sensitive to changes in the waveguide geology. The radiowave attenuation rate and the phase shift can be measured and the measurements will reveal structural features of the coal seam. If the waveguide were uniform, then the path would be a straight line. The straight line path is an assumption used in the Algebraic Reconstruction Technique (ART) tomography algorithm. But radiowaves are refracted near significant geologic anomalies causing the travel path of the radiowave to bend and be longer than in the uniform waveguide case. Such bending cannot be accounted for in ART processing and so causes an error. But, by measuring the total path phase shift, the bending effect can be accounted for in Full Wave Inversion Code (FWIC), a tomography reconstruction algorithm. The waveguide attenuation effect reduces the magnitude of the electromagnetic wave along the path.

It has been observed that the coal seam attenuation rate will increase with signal frequency. The wavelength increases as frequency decreases. By lowering the operating frequency, the measurement range increases. But such range still depends on coal seam thickness, the type of bounding sedimentary rock, and the electrical conductivity of the coal.

Intrusions of sandstone sedimentary rock into the coal seam increase the attenuation rate at that point. This is because more of the signal travels vertically into the boundary rock and leaks from the waveguide. If water has invaded the coal, then any wet clay in the coal will cause the electrical conductivity to decrease and the attenuation-rate/phase-shift to increase. Such effects allow tomography to be used to image such geologic anomalies.

The attenuation-rate/phase-shift rapidly increases with decreasing seam height, so coal seam thinning can be easily detected. Higher attenuation-rate areas suggest that the coal seam boundary rock is changing, the seam is rapidly thinning, or/and water has invaded the coal seam.

Faults and dykes in the coal seam will cause signal reflections within the waveguide. Such reflections can appear as excess path loss, but can be differentiated as being caused by faults and dykes in the coal by also taking phase shift measurements.

The preferred operating frequency band extends from a few kilohertz to well over 300 kHz. The few kilohertz lower limit is due to the practical problems in building low frequency antennas with their longer wavelengths, and the high frequency limit is due to the increased coal seam waveguide attenuation rate with frequency. Instrument design and tomographic image processing algorithms can greatly increase coal seam imaging resolution.

Tomographic ART images often have in the direction of the signal wave propagation. The ART algorithm assumes that the coal seam waveguide signal travels on a straight ray path. Severe geologic anomalies can cause signal refraction, in which case the ray-path assumption fails.

Referring again to FIG. 2, the drillstring 212 preferably includes a radar with both upward and downward looking antennas to non-invasively determine the vertical middle of coal layers 204 and 206. Such further preferably includes a dielectric-constant measuring sensor and an inductive radio for communicating measured data to the surface. The combination of these are also able to produce information on faulting, cracking, and groundwater infiltration of the coal seam. Such data is stored electronically for use later, e.g., to determine where not to punch perforation holes in a plastic liner used in CBM gas collection through the borehole 210.

For example, the drillstring 212 includes at its distal end behind drillhead 214 a measure-while-drilling (MWD) instrument with a stepped-frequency radar operating in the 1.7 to 2.5-GHz range. Typically, fifty frequency steps are used to cover the frequency range. At each frequency step, in-phase (I) and quadrature (Q) radar return signal values are measured and transmitted to a user display at the ground surface. The I and Q values for all step frequencies are decoded and processed in a fast Fourier transform (FFT) to derive the time domain response from each of the roof and floor to the coal interface. The distances to each interface can then be determined from these measurements by taking into account the relative dielectric constant.

Alternatively, since the object of steering the drillstring 212 is to stay in the vertical middle of the coal seam 204 and 206, the raw measurements from the upward-looking and downward-looking radar antennas can be compared in their raw uncorrected state to see if they are about the same. If so, the measurements can be assumed to have occurred at the vertical middle, e.g., equidistant to ceiling and floor. The corrective information for each from the dielectric-constant sensor can in such case be dispensed with.

Accurate geologic data can be opportunistically acquired while drilling through such coal seams. But to do this, the radar acquired distance data must be corrected for relative dielectric constant (∈r) to determine the actual physical distance. In such case, the instrumentation must include a local dielectric-constant measuring capability.

The FFT computations needed for real-time MWD is very computer-intensive. With the present state-of-the-art in microprocessors, the measured data must be processed above ground where larger, more capable computers an be operated. Such computers also demand operating power that is too much for battery operation in the drillstring 212. Therefore the measurements are communicated along the drillstring, e.g., using inductively coupled radio communication.

Such upward-looking and downward-looking radar can also determine the type of boundary rock in the roof and floor. Regions of high coal seam where the relative dielectric constant is high, e.g., greater than 6.0, are unattractive because they produce greater amounts of water in the methane drainage system. Any coal deposit set under a paleochannel and having a dielectric constant under 6.0 suggests that the paleochannel is dry and will contain methane. Drilling near dry paleochannels increases methane production.

Conventional horizontal drilling navigation systems cannot directly determine seam thickness or changes in seam orientation, dips and rolls, without trial-and-error exploratory drilling of the floor and the roof in the same region of the panel. Thus, when the seam horizon changes, the drill will impact the roof or floor. A drilling machine operator with such conventional methods detects when the drill is on the roof or floor horizon by evidence of rock in the cuttings. The drilling technician redirects the drill motor to try to keep the drill within the seam. The borehole that results wanders between the roof and floor of the coal seam along its path. Punching through to roof or floor interfaces can invite groundwater to infiltrate the borehole.

Figure 3A:
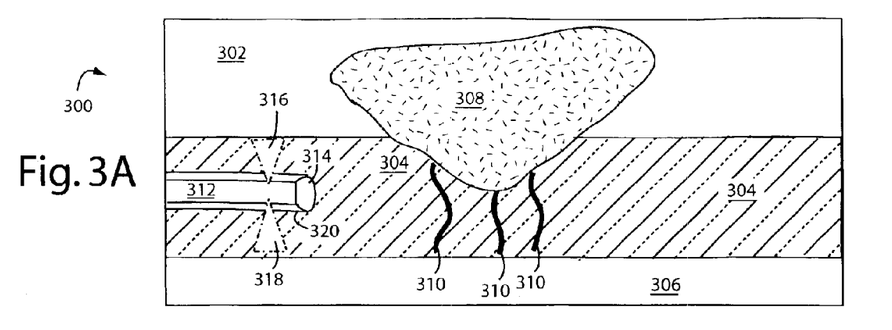
FIGS. 3A–3C illustrate the sequence of drilling a horizontal borehole in a coalbed for methane production.
Figure 3B:
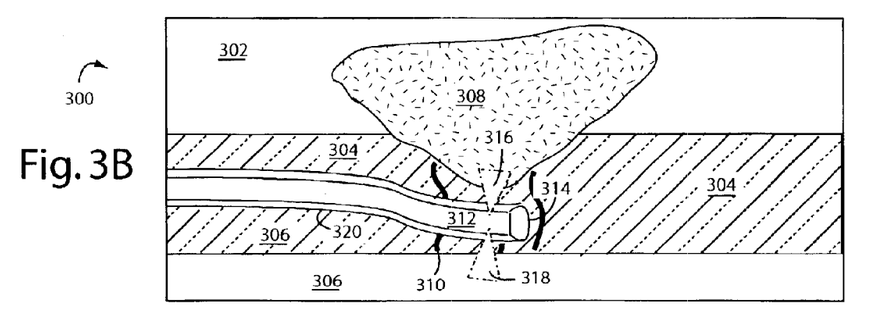
Figure 3C:
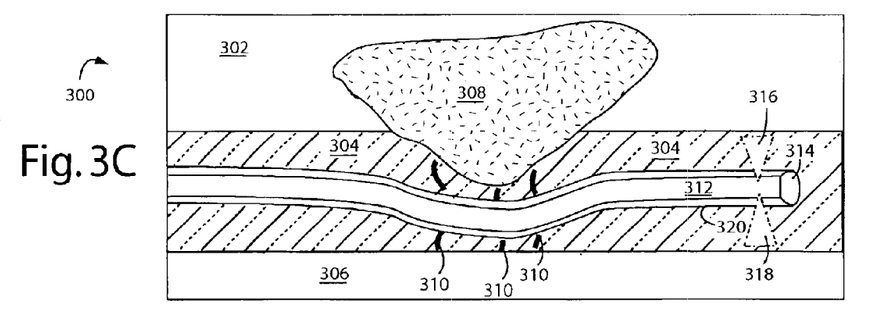
Figure 3D:
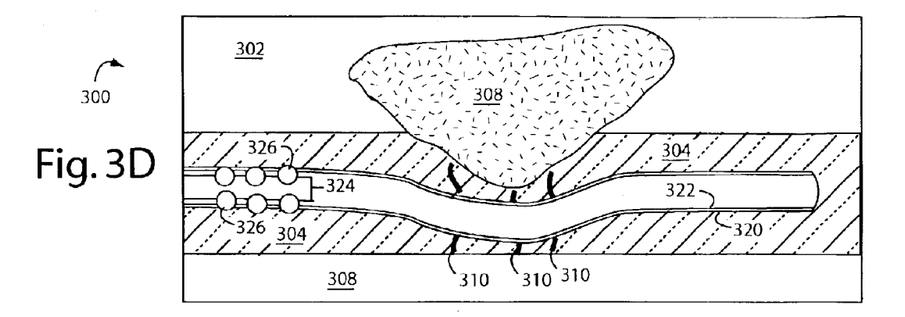
FIGS. 3D–3F illustrate a method embodiment of the present invention in which the sequence of FIGS. 3A–3C is followed by lining the borehole with plastic pipe and selectively perforating it with a punch. Holes in the pipe liner are punched at locations that will avoid allowing in groundwater.
Figure 3E:
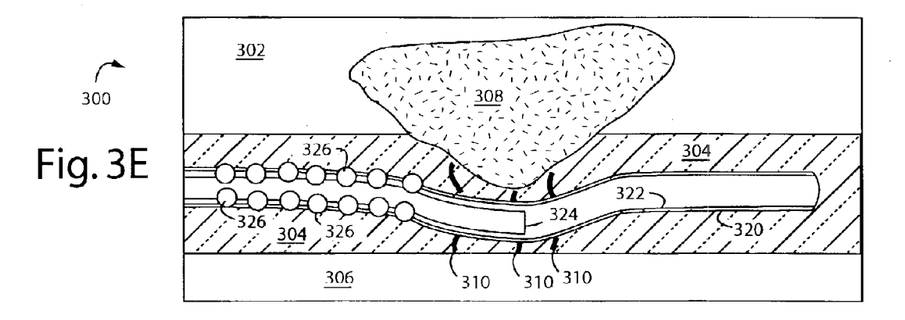
Figure 3F:
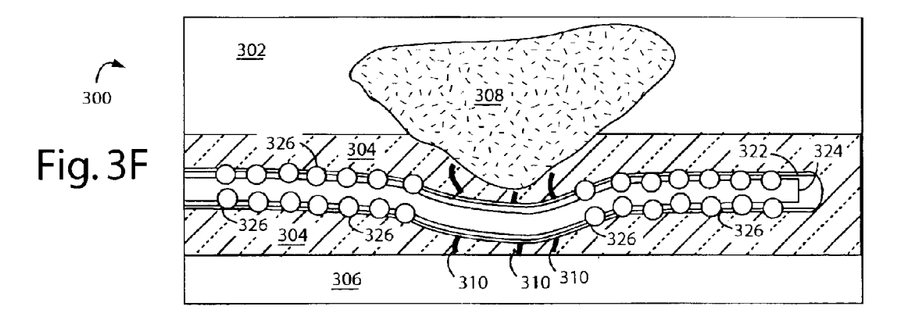

FIGS. 3A–3C illustrate a directional drilling sequence that is followed, in FIGS. 3D–3F, by lining the borehole with a plastic pipe and then perforating the plastic pipe to allow coalbed methane (CBM) gas collection. These represent a method embodiment of the present invention which is referred to herein by the general reference numeral 300.

A soil overburden 302 caps a virgin coal seam 304. This in turn overlies a deeper substrate layer 306. As is a common occurrence, a sandstone-filled paleochannel 308 gouges into the roof of coal seam 304 and causes a narrowing of the coal deposit underneath. Such a feature is also usually associated with a set of fractures 310. The sandstone-filled paleochannel 308 and fractures 310 can be infiltrated with groundwater, and such water can result in a disaster or at least increased costs if allowed to seep into the CBM workings.

A directional drillstring 312 has a steerable drillhead 314, an upward-looking radar lobe 316, and a downward-looking radar lobe 318. The radar lobes are generated by a ground-penetrating radar system, as in FIGS. 4 and 5. Such is able to sense the coal seam interfaces with boundary rock in the floor and ceiling, fractures in the coal, and any sandstone intrusions or groundwater infiltration of the coal. As the directional drillstring 312 moves along it drills a borehole 320.

FIGS. 3A–3C show the progress of the directional drillstring 312 as it bores under the sandstone-filled paleochannel 308 and passes through the fractures 310. As it moves along, the ground-penetrating radar system generates information about the deposits that is logged into a memory or database. Such information includes determinations of whether groundwater is present in the immediate area of the borehole 320.

FIGS. 3D–3F represent the next steps in which the drillstring 312 has been withdrawn and a plastic pipe liner 322 has been installed inside borehole 320. A punch 324 is inserted inside plastic pipe liner 322 and is used to punch a series of perforations 326 through the plastic pipe. Such perforations allow CBM gas to seep inside past the plastic pipe liner 322. Such CBM gas is then removed and sold on the commercial market. Once the coal seam 304 has been sufficiently de-gassed, coal mining operations can be safely commenced. A radar survey of the coal seam 302 collected in the steps of FIGS. 3A–3C can thereafter be used to provide economic data on the coal reserves, its quality, and hazards.

The punch 324 is shown in FIG. 3E as not punching any perforations 326 in the area under sandstone paleochannel 308 and around fractures 310. Such areas were sensed in the steps of FIG. 3 as being infiltrated with groundwater. A memory or database an be used to store information on which areas of the pipe not to punch, or an operator on the surface at a control console can direct the operations manually. As the punch 324 proceeds further in FIG. 3F, the punching of perforations 326 resumes.

Figure 4:
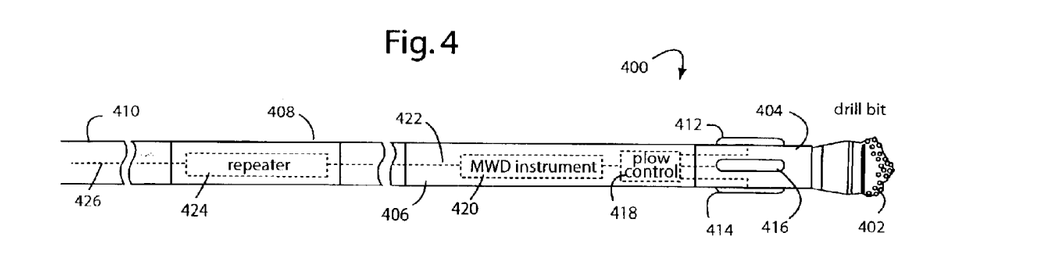
FIG. 4 is a functional block diagram of a drillstring radar embodiment of the present invention, and shows the electronic components and their relationships as used in the equipment of FIGS. 1, 2, and 3A–3F.

FIG. 4 illustrates a radar-plow drillstring steering system 400 that could be used to directionally drill the borehole of FIGS. 3A–3C. It further can be operated to sense and log the various locations along the borehole where groundwater is in contact. This information is stored at the surface in a computer or operator's console for use later.

The radar-plow drillstring steering system 400 comprises a drill bit 402 on a distal end, a steering plow 404, an electronics section 406 with retrieval docking, a repeater section 408, and a drillstring section 410. The steering plow 404 includes a set of four radially distributed pressure pads for up-down-left-right drilling control. Three of these pressure pads are visible in FIG. 4, e.g., a top pressure pad 412, a bottom pressure pad 414, and a side pressure pad 416. These are all controlled to assume various states of protrusion or retraction by a plow control 418. A measurements-while-drilling (MWD) instrument 420 processes radar signals to-and-from horn radar antennas and dielectric-constant sensors embedded in respective ones of the four radially distributed pressure pads. The MWD instrument 420 provides estimates in real-time-of the distances to the boundary layers in the floor and ceiling of a coal seam. These estimates are used by the plow control to maintain a desired course through the coal seam. A tether 422 is used to retrieve MWD instrument 420 from within the drillstring back to the surface if he drill bit 402 jams and cannot be retracted. A signal repeater 424 assists in long range communication between the MWD instrument 420 and an operator display and tomographic processor on the surface. A second tether 426 is used to retrieve the signal repeater 424.

Figure 5:
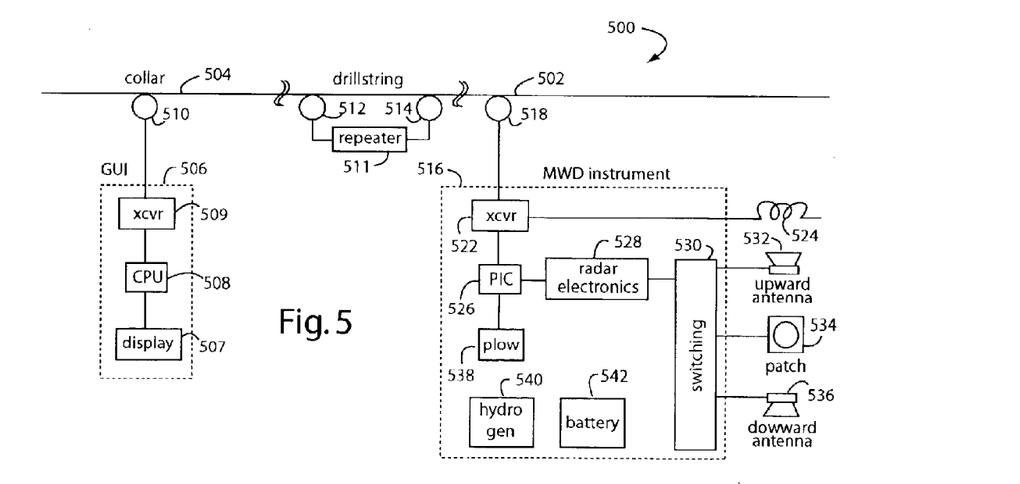
FIG. 5 is a schematic diagram of a ground-penetrating radar system embodiment of the present invention, and is one way to implement the electronics portion of the equipment illustrated in FIG. 4.

FIG. 5 illustrates a drillstring radar system 500 and is similar to a part of system 400 in FIG. 4. The drillstring radar system 500 comprises a downhole drillstring 502 connected to a surface collar 504. A graphical user interface (GUI) 506 is positioned at the surface and processes tomographic images of the measurements-while-drilling on a user display 507. A microcomputer (CPU) 508 does data logging and processes raw data received by a transceiver 509 from the downhole equipment. A signal coupler 510 allows the transceiver 509 to se the collar 504 and drillstring 502 as a common transmission line. A radio repeater 511 repeats and amplifies "F1/F2" signals through its couplers 512 and 514. If the drillstring 502 is relatively short, and signal attenuation is not severe, then repeater 511 may not be needed. A measurements-while-drilling (MWD) instrument 516 is connected to the radio signals on the drillstring 502 by a coupler 518. Coupler 518 is operated at about 100-kHz and typical comprises 14-turns of Litz-wire on a 12-inch long coil one inch wide and mounted edge on to the drill rod.

The MWD instrument 516 comprises a radio transceiver 522 that is connected to an antenna 524. Such antenna 524 is operated at about 125-kHz and typical comprises 14-turns of Litz-wire on a 24-inch long ferrite rod one inch in diameter. It communicates with other radar imaging equipment collocated in another parallel borehole. A more complete description of how this antenna is used and how associated radar imaging equipment located in associated parallel boreholes can be used to advantage in coal deposit imaging, is provided in other United States patent applications of the present inventor, e.g., Ser. No. 10/259,912, filed Sep. 30, 2002, and titled, RADIO-IMAGING OF UNDERGROUND STRUCTURES. Such are incorporated herein by reference.

A processor (PIC) 526 interfaces the raw measurements from a radar electronics 528 to the transceiver 522. A switching matrix 530 allows the selection of an upward-looking radar horn antenna 532, a resonant microstrip patch antenna (RMPA) 534, and a downward-looking radar horn antenna 536.

Such horn antennas are respectively embedded in the pressure pads associated with the steering plow. Such are preferably operated in the 2.0–2.5 GHz frequency band and have at least 20-dB of back-lobe rejection. A plow controller 538 provides control signals in real-time to guide the direction of drilling according to measurements obtained by the radar electronics 528.

Electrical power for the MWD instrument 516 can be provided by a hydro-generator 540 that taps into the hydraulic fluid flow through the drillstring, or by a rechargeable battery 542, or both. Using both would allow data to continue to be collected and reported even though the hydraulic flow may have been stopped for some reason.

The MWD instrument 516 is preferably retractable should the drillstring become stuck in the drillhole. For example, the MWD instrument is equipped with a self-docking mechanism to interconnect with the antenna array subsection drill rod. A retractable capability permits the MWD instrument and repeater to be hydraulically pumped-in and pulled out of the drillstring. Such a shuttle mechanism is described by the present inventor in U.S. patent application Ser. No. 10/161,378, filed Jun. 4, 2002, and titled SHUTTLE-IN RECEIVER FOR RADIO-IMAGING UNDERGROUND GEOLOGIC STRUCTURES. Alternatively, a docking mechanism associated with the MWD instrument and its antenna array allows the MWD instrument to be retrieved back inside the drillstring with a tether should the drill head become hopelessly jammed or locked into the earth.

The antenna array is preferably designed to accommodate the radar and dielectric microwave antennas, the radar transmitter antenna, and the data transmission antenna. For economy, the radar transmitter function can use the transmitter section of the data transceiver 522 during periods that data is not being sent to the surface collar. The MWD instrument is placed inside a beryllium-copper drill rod section, e.g., ten feet long. In one instance, the antenna array and MWD instrument was located fifteen feet behind the downhole motor.

Figure 6A:
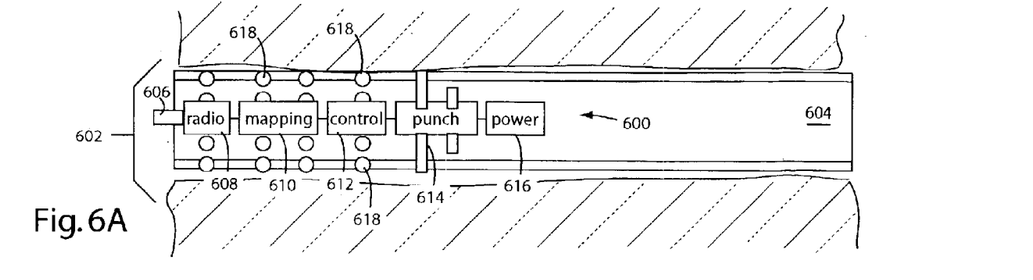
FIG. 6 is a diagram of a borehole liner punch embodiment of the present invention that can be used in the sequence illustrated in FIGS. 3A–3F.
Figure 6B:
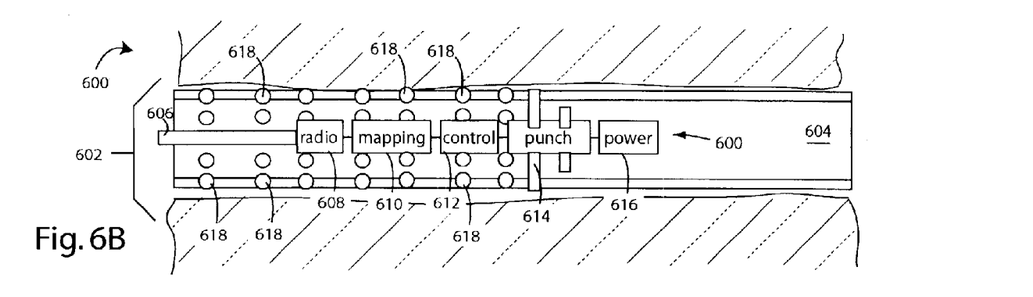
Figure 6C:
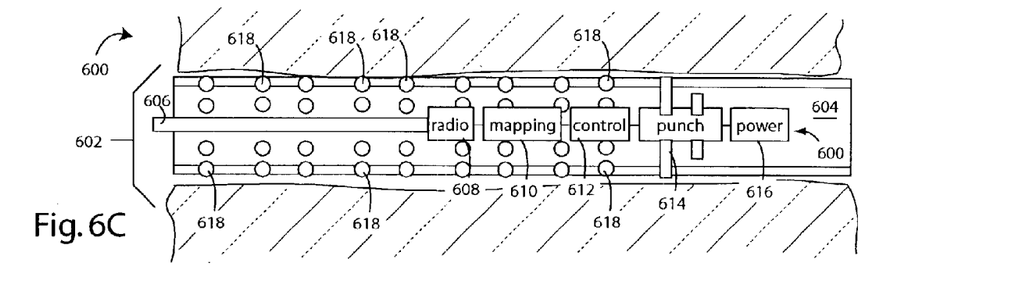

FIGS. 6A–6C illustrate a punch system embodiment of the present invention, and is referred to herein by the general reference numeral 600. The punch system 600 moves along inside a plastic pipe 602, for example a pipe used as a liner in a CBM borehole 604. A drill rod 606 is used to maneuver the punch system 600 in and out of the CBM borehole 604. Alternatively, the punch system 600 can be hydraulically pumped into place and retrieved with a tether cord. It is also possible to make the punch system 600 self-propelled. The punch system 600 comprises a radio 608 for communicating location, status, and command information with a surface control console; a mapping storage 610 to hold the locations within CBM borehole 604 that are scheduled to have the plastic pipe 602 punched with perforations; a controller 612; a punch unit 614; and a power supply 616. Perforations already punched into the walls of plastic pipe 602 are represented by a plurality of holes 618. The punch 614 could be electrically operated, but in an explosive atmosphere of CBM gas, it is preferable to implement such with a hydraulic type. The power supply 616 could be a battery, but is may also be preferably instead to use a hydro generator that takes advantage of pressurized drilling fluid that can be sent down.

FIGS. 6B and 6C show the punch system 600 after it has advanced down the plastic pipe 602 and CBM borehole 604. More holes 618 are produced, and sections can be left unpunched according to an information schedule downloaded to the mapping memory 610.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A coalbed methane borehole pipe liner perforation system, comprising:

a database for storing an information schedule related to particular locations of infiltrating groundwater contact along a borehole in a gas-bearing coal bed;

a plastic pipe liner for disposition within said borehole, for extracting a gas in said coal bed, and for excluding the collection of said infiltrating groundwater;

a punch mechanism for disposition within said plastic pipe liner and movable to a plurality of longitudinal positions; and     means for operating the punch mechanism according to the information schedule such that perforations are made in areas of the plastic pipe liner that are not in contact with said infiltrating groundwater.

2. The system of claim 1, further comprising:

a directional drill with a ground-penetrating radar able to guide drilling said borehole and that provides for an analysis of the soils it passes through for water content;

wherein a log is created and stored in the database to later dictate the places in said plastic pipe liner that should not be perforated.

3. A coalbed methane borehole pipe liner perforation system, comprising:

a plastic pipe punch able to be slipped down inside a coalbed methane production borehole lined with a non-perforated plastic pipe;

a ground-penetrating radar for use inside a plastic-pipe lined borehole to determine if any sections of the pipe are in contact with groundwater;

wherein, the punch is operable along the length of said plastic-pipe lined borehole to perforate it for methane-gas collection wherever such groundwater is not present.

4. The system of claim 3, further comprising:

a radar survey instrument that logs any locations of said groundwater contact simultaneously in combination with a punching of said liner pipe perforations.

5. The system of claim 3, further comprising:

a radar survey instrument that logs any locations of said groundwater contact in a separate operation before punching of said liner pipe perforations.

6. A method of coalbed methane production, the method comprising the steps of:

directional drilling a horizontal borehole through a coalbed deposit to be de-gassed;

lining said horizontal borehole with a plastic pipe; and punching perforation holes in said plastic pipe from within and while said plastic pipe is in its final location in said horizontal borehole; and de-gassing said coalbed deposit through said perforation holes and up out said plastic pipe.

7. The method of claim 6, further comprising the step of:

using a ground-penetrating radar to determine locations along said plastic pipe that would probably allow in groundwater if punched with said perforation holes.

8. The method of claim 6, further comprising the step of:

not punching said plastic pipe at places that would probably allow in groundwater if punched with said perforation holes.

9. The method of claim 6, further comprising the step of:

logging data obtained from a ground-penetrating radar that is related to whether particular locations along said plastic pipe would probably allow in groundwater if punched with said perforation holes.

10. The method of claim 6, further comprising the step of:

logging data obtained from a ground-penetrating radar that is related to whether particular locations along said plastic pipe would probably allow in groundwater if punched with said perforation holes; and directing the operation of a pipe punch movable within said plastic pipe according to data obtained in the step of logging.

* * * * *